Dec. 22, 1936.    A. E. ANDERSON    2,065,360
AUTOMATIC RECLOSING CIRCUIT BREAKER SYSTEM
Filed Sept. 27, 1934

Inventor:
Arvid E. Anderson,
by Harry E. Dunham
His Attorney.

UNITED STATES PATENT OFFICE 2,065,360

AUTOMATIC RECLOSING CIRCUIT BREAKER SYSTEM

Arvid E. Anderson, Drexel Hill, Pa., assignor to General Electric Company, a corporation of New York Application September 27, 1934, Serial No. 745,743

7 Claims. (Cl. 175—294)

My invention relates to automatic reclosing circuit breaker systems and particularly to such systems in which the initial reconnection of two electric circuits is made substantially instantaneous after the connection between them is interrupted for the first time in response to a fault on one of the circuits.

In order that service may be interrupted for as short a time as possible, it is desirable in some cases that the time interval elapsing before the first reconnection be in the order of five to fifteen cycles. One object of my invention is to provide an automatic reclosing circuit breaker system in which such a small time of interruption may be obtained.

In accordance with my invention I provide two circuit breakers between the two electric circuits, one of these circuit breakers being normally closed and the other being normally open. Upon the occurrence of a fault, suitable control means are provided whereby the opening operation of the closed circuit breaker and the closing operation of the open circuit breaker are initiated at the proper times so as to obtain the desired minimum time interval during which the two circuit breakers are open.

My invention will be better understood from the following description when taken in connection with the accompanying drawing, and its scope will be pointed out in the appended claims.

Figure 1:
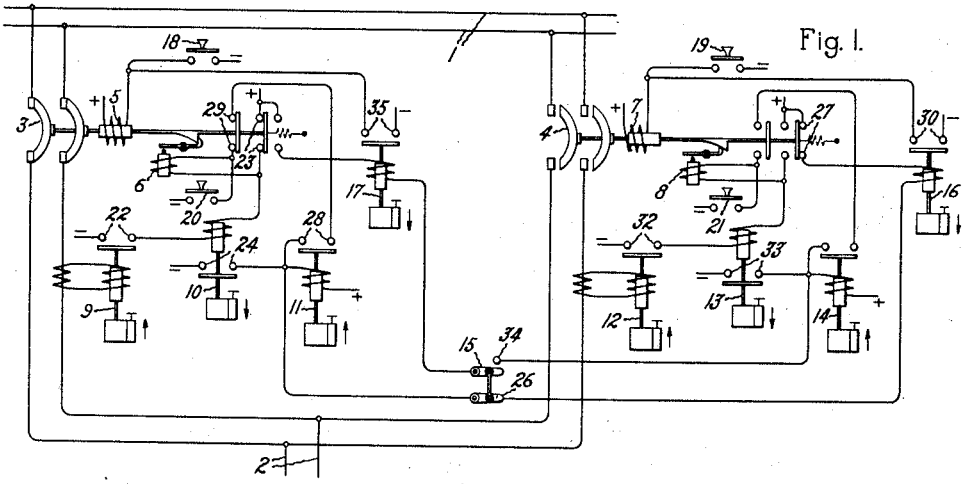
Figure 2:
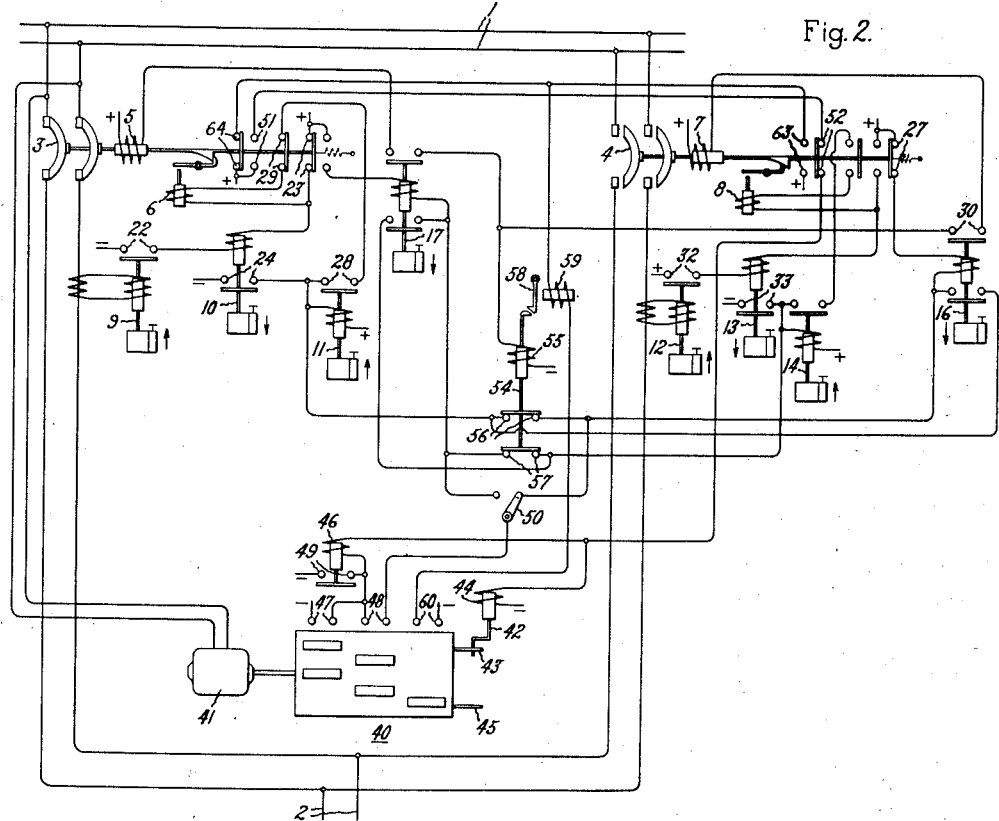

In the accompanying drawing Fig. 1 is a diagrammatic representation of an automatic reclosing circuit breaker system embodying my invention, and Fig. 2 is a modification of the arrangement shown in Fig. 1.

Referring to Fig. 1, I represents a supply circuit which is arranged to be connected to a load circuit 2 by means of a circuit breaker 3 when it is closed and also by means of a circuit breaker 4 when it is closed. In order to simplify the disclosure, I have shown single phase circuits but it is obvious that my invention is applicable also to direct current and polyphase circuits. The circuit breakers 3 and 4 may be of any suitable type, examples of which are well-known in the art. I have shown these circuit breakers as being of the well-known latched-in type. The circuit breaker 3 is provided with a closing coil 5 which, when energized, closes the circuit breaker and a trip coil 6, which when energized effects the opening of the circuit breaker. The circuit breaker 4 is provided with a similar closing coil 7 and a similar trip coil 8.

For effecting the opening of the circuit breaker 3, when it is closed and a fault occurs on the load circuit 2, I provide an overcurrent relay 9 which is connected in any suitable manner so as to be energized in accordance with the current flowing through the circuit breaker 3. Associated with the overcurrent relay 9 is an auxiliary control relay 10 which is energized to effect the energization of a suitable time relay 11 when the current through the circuit breaker 3 is sufficient to effect the operation of the overcurrent relay 9. The time relay 11 when energized for a predetermined time is arranged to complete an energized circuit for the trip coil 6.

For effecting the opening of the circuit breaker 4, when it is closed and a fault occurs on the load circuit 2, I provide an overcurrent relay 12 which is connected in any suitable manner so as to be energized in accordance with the current flowing through the circuit breaker 4. The overcurrent relay 12 has associated therewith an auxiliary control relay 13 and a time relay 14, similar respectively to the relays 10 and 11, for effecting the energization of the trip coil 8 of the circuit breaker 4 a predetermined time after the current through the circuit breaker 4 exceeds a value sufficient to effect the operation of the overcurrent relay 12.

In accordance with my invention each of the control relays 10 and 13 is also arranged so that it initiates the closing of the other circuit breaker if its associated circuit breaker is the one which is normally closed. For example, if the two-position selecting switch 15 is in the position shown, the relay 10, when energized, completes an energizing circuit for the auxiliary closing relay 16, which in turn completes an energizing circuit for the closing coil 7 of the circuit breaker 4. Similarly, if the switch 15 is in its other position, the control relay 13 when energized completes an energizing circuit for the auxiliary control relay 17, which in turn completes an energizing circuit for the closing coil 5 of circuit breaker 3.

In order that the opening and closing of the circuit breakers 3 and 4 may be manually controlled, suitable manually controlled switches 18, 19, 20 and 21 may be provided, which when closed respectively complete energizing circuits for the closing coils 5 and 7 and the trip coils 6 and 8.

The operation of the arrangement shown in Fig. 1 is as follows: It will be assumed that circuit breaker 3 is closed, circuit breaker 4 is open, the selecting switch 15 is in the position shown, and an overload occurs on the load circuit 2 which is sufficient to cause the overcurrent relay 9 to close its contacts 22. The closing of the contacts 22 completes through the auxiliary contacts 23 on the closed circuit breaker 3 an energizing circuit for the control relay 10. Relay 10, by closing its contacts 24, completes an obvious circuit for the time relay 11 and also an energizing circuit for the auxiliary closing relay 16 associated with the circuit breaker 4. This energizing circuit for the relay 16 also includes the contacts 26 of the selecting switch 15 and the auxiliary contacts 27 on the open circuit breaker 4. After being energized for a predetermined time, relay 11 closes its contacts 28 and completes an energizing circuit for the trip coil 6, which in turn effects the opening of the circuit breaker 3. The energizing circuit of the trip coil 6 also includes the contacts 24 of the relay 10 and the auxiliary contacts 23 and 29 on the closed circuit breaker 3. The auxiliary closing relay 16 when energized closes its contacts 30 and completes an energizing circuit for the closing coil 7, thereby effecting the closing of the circuit breaker 4.

From the above description, it is apparent that the relay 10, when energized, simultaneously initiates the closing operation of the circuit breaker 4 and the opening operation of the circuit breaker 3. Since the closing time of the circuit breaker 4 is relatively long compared with the tripping time of the circuit breaker 3, it is desirable that the closing circuit of the closing coil 7 should be energized prior to the energization of the trip coil 6 of the circuit breaker 3. By proper adjustment of the relay 11, the tripping of the circuit breaker 3 can be delayed so that it will occur at the proper time interval prior to the closure of the circuit breaker 4.

With the circuit breaker 4 closed and the selector switch 15 in the position shown, it is evident that if an overload should occur which caused the overcurrent relay 12 to close its contacts 32 and effect the energization of the auxiliary control relay 13, the closing of the contacts 33 of this relay 13 would not effect the energization of the auxiliary closing relay 17 associated with the circuit breaker 3 because the circuit of this relay 17 would be open at the contacts 34 of the selecting switch 15. Therefore, if the fault should also cause the circuit breaker 4 to open immediately after it closed, the circuit 2 would then remain disconnected from the supply circuit 1. If, however, the circuit breaker 4 remains closed and the selecting switch 15 is then moved to its other position, it is obvious that when the circuit breaker 4 is opened in response to an overload on the load circuit 2, the auxiliary control relay 13, by closing its contacts 33, will effect the energization of the auxiliary closing coil 17, which in turn by closing its contacts 35, will cause the circuit breaker 3 to close substantially instantaneously after the circuit breaker 4 opens.

In the modification shown in Fig. 2, I have provided additional reclosing means whereby if the faulty condition does not permit the initial reconnection to be maintained, the two circuits are then reconnected a predetermined number of times with relatively long predetermined time intervals between successive reconnections. The additional reclosing means, which may be of any suitable type, examples of which are well known in the art, is shown as comprising a timer 40 and a driving motor 41 therefor which is permanently connected to a suitable source of current such as the supply circuit 1. The motor 41 is normally prevented from rotating by a stop 42 which engages a projection 43 on the rotatable element of the timer. The stop 42 is arranged to be moved out of engagement with the projection 43 by a release magnet 44 when it is energized. The stop 42 is also arranged to engage another projection 45 on the rotatable element of the timer if the magnet 44 is energized when the timer has reached a predetermined position after having effected a predetermined number of reclosures. This position of the timer is called the lockout position and when the timer is held in this position by stop 42, further operation of the timer to effect additional reclosures is prevented.

The timer 40 is provided with two sets of contacts 47 and 48, which are arranged to be closed a plurality of times in a predetermined sequence as the timer rotates. The timer is arranged so that only one of these sets of contacts is closed at any given time. When the contacts 47 are closed, a circuit is completed for a control relay 46 if the circuit breaker to be closed by the timer is open, and the relay 46 by closing its contacts 49 completes a locking circuit for itself, so that when the contacts 47 of the timer are subsequently opened, the relay remains energized as long as the circuit breaker remains open. When the contacts 48 are closed and the relay 46 is in its energized position, a circuit is completed through the contacts 47 and 48 for the auxiliary closing relay 16 or 17 depending upon the position of a manually controlled selecting switch 50 to effect the closing of the associated circuit breaker. In order to start the timer 40 into operation, a circuit for the release magnet 44 is arranged to be completed through the series connected contacts 51 and 52 on the circuit breakers 3 and 4 respectively when both of these circuit breakers are simultaneously open.

In order to prevent the instantaneous reclosure of the circuit breaker which was normally closed in case the substituted circuit breaker opens within a predetermined time after its initial closure, a lockout relay 54 is provided which is arranged to be operated in response to the closing of either circuit breaker. This lockout relay controls contacts in the instantaneous closing circuit for each circuit breaker. As shown, the operating coil 55 of the lockout relay 54 is connected in series with the closing coils 5 and 7 so that the operating coil 55 is energized when either of these closing coils is energized. The relay 54 when in its energized position opens the contacts 56 which are in series with the contacts 24 of relay 10 in the instantaneous closing circuit for the auxiliary closing relay 16 and contacts 57 which are in series with contacts 33 of relay 13 in the instantaneous closing circuit for auxiliary closing relay 17. The relay 54 is arranged in any suitable manner so that it is held in its energized position after the operating coil 55 is deenergized. In the particular arrangement shown, this result is obtained by means of a latch 58 which holds the relay in its energized position and which is arranged to be released by a release coil 59 when it is energized. In order to reset the relay 54 to its normal position in case the load circuit remains connected to the supply circuit after the relay 54 has been operated, a circuit is arranged to be completed through a third set of contacts 60 on the timer 40 after it has been in operation for a predetermined time and if at the same time one of the circuit breakers is closed.

With the circuit breaker 3 closed, the circuit breaker 4 open, and the selecting switch 50 in the position shown, it will be obvious from the description given above in connection with the embodiment of my invention shown in Fig. 1 that the closing of the contacts 22 of the overcurrent relay 9 will effect the opening of the circuit breaker 3 and the substantially instantaneous closing thereafter of the circuit breaker 4. Since the operating coil 55 of the lockout relay 54 is connected in series with the closing coil 7 of the circuit breaker 4, this relay will open its contacts 56 and 57 at the same time the circuit breaker 4 is being closed.

During the short time interval that both of the circuit breakers 3 and 4 are open, a circuit is completed through the auxiliary contacts 51 and 52 on the circuit breakers 3 and 4 respectively for the release magnet 44 of the timer 40. The energization of the release magnet 44 moves the stop 42 out of engagement with the projection 43 so that the motor 41 can rotate the timer.

If the circuit breaker 4 remains closed, the operation of the timer 40 does not have any effect until it closes its contacts 60, at which time a circuit is completed for the release coil 59 of the lockout relay 54 to release the latch 58 so that the relay 54 is restored to its normal position. The circuit of the release coil 59 also includes the auxiliary contacts 63 on the circuit breaker 4. Auxiliary contacts 64 are provided on circuit breaker 3 for completing a similar circuit for the release coil 59 when circuit breaker 3 is closed.

If, however, the faulty condition still exists when the circuit breaker 4 is closed, the overcurrent relay 12 will operate in an obvious manner to effect the energization of the trip coil 8 to effect the opening of the circuit breaker 4. Since at this time the lockout relay 54 will be in its energized position, the closing of the contacts 33 of the relay 13 does not effect the instantaneous closure of the circuit breaker 3 because the instantaneous closing circuit for the auxiliary relay 17 is open at the contacts 57 of relay 54. The circuit breaker 4 then will remain open until the timer 40 closes its contacts 47 and completes a circuit for the control relay 46. This circuit also includes the auxiliary contacts 51 and 52 on the circuit breakers 3 and 4 respectively. The closing of the contacts 49 of relay 46 completes a circuit in parallel with the contacts 47 of the timer 40 so that the relay 46 remains energized after the contacts 47 are subsequently opened. Further rotation of the timer 40 then opens contacts 47 and subsequently effects the closure of contacts 48 to complete a circuit for the auxiliary closing relay 16. This circuit also includes the auxiliary contacts 27 on the circuit breaker 4, contacts of the switch 50 and contacts 49 of the relay 46. Relay 16, by closing its contacts 30, completes an obvious circuit for the closing coil 7 of the circuit breaker 4 to effect the closing of the circuit breaker 4.

If the abnormal condition has disappeared, the circuit breaker 4 remains closed. The motor 41, however, continues to drive the timer 40 until it reaches its normal position, in which position the stop 42 engages the projection 43. Since the circuit of the relay magnet 44 is open at the auxiliary contacts 52 on the closed circuit breaker 4, the projection 45 does not engage the stop 42 when the timer 40 reaches its lockout position.

If the abnormal condition is still connected to the load circuit when the circuit breaker 4 is reclosed, the overcurrent relay 12 again effects the opening of the circuit breaker 4 and the timer 40 again operates in the same manner as above described to reclose the circuit breaker after it has been opened a predetermined length of time.

With the arrangement shown, the timer 40 will effect the reclosure of the circuit breaker two times but obviously it may be any desired number of times. If the circuit breaker 4 opens immediately after the second reclosure so that the release magnet 44 is energized when the timer reaches its lockout position, the projection 45 engages the stop 42 to hold the timer in the lockout position so that the timer is prevented from effecting further reclosures until the stop 42 is moved out of engagement with the projection 45.

With the circuit breaker 4 closed and the selecting switch 50 in its other position, it will be obvious that when the circuit breaker 4 is opened by an abnormal condition on the load circuit, the circuit breaker 3 is closed substantially instantaneously after the circuit breaker 4 opens, and the timer 40 will operate to effect a predetermined number of reclosures of the circuit breaker 3, if it fails to remain closed after its initial closing.

While I have, in accordance with the patent statutes, shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:

1. In combination two electric circuits, a circuit breaker interconnecting said circuits, a second circuit breaker for interconnecting said circuits, and fault responsive means for effecting the opening of said first mentioned circuit breaker and for initiating the closing of said second circuit breaker before said first mentioned circuit breaker opens.

2. In combination two electric circuits, a circuit breaker interconnecting said circuits, a second circuit breaker for interconnecting said circuits, and means responsive to a predetermined abnormal condition on one of said circuits for initiating the opening of said first mentioned circuit breaker and for initiating the closing of said second circuit breaker before said first mentioned circuit breaker opens whereby the closing of said second circuit breaker occurs substantially instantaneously after the opening of said first mentioned circuit breaker.

3. In combination, two electric circuits, a latched closed circuit breaker interconnecting said circuits, a trip coil for releasing said circuit breaker, a second circuit breaker for interconnecting said circuits, closing means for said second circuit breaker and fault responsive means for initiating the operation of said closing means prior to the energization of said trip coil.

4. In combination two electric circuits, a latched closed circuit breaker interconnecting said circuits, a trip coil for releasing said circuit breaker, a second circuit breaker for interconnecting said circuits, a closing coil for said second circuit breaker, means responsive to a predetermined abnormal condition on one of said circuits for initiating the energization of said closing coil, and timing means controlled by said abnormal condition, responsive means for initiating the energization of said trip coil a predetermined time after the energization of said closing coil is initiated.

5. In combination two electric circuits, a latched closed circuit breaker interconnecting said circuits, a trip coil for releasing said circuit breaker, a second circuit breaker for interconnecting said circuits, a closing coil for said second circuit breaker, an overload relay connected to one of said circuits, and means responsive to the operation of said relay for effecting the completion of an energizing circuit for said closing coil and the subsequent completion of an energizing circuit for said trip coil.

6. In combination two electric circuits, a circuit breaker interconnecting said circuits, a second circuit breaker for interconnecting said circuits, fault responsive means for effecting the opening of said first mentioned circuit breaker and for initiating the closing of said second circuit breaker before said first mentioned circuit breaker opens, fault responsive means for opening said second circuit breaker, and means for reclosing said second circuit breaker a predetermined number of times with predetermined time intervals between successive reclosures.

7. In combination two electric circuits, a circuit breaker interconnecting said circuits, a second circuit breaker for interconnecting said circuits, means responsive to a predetermined abnormal condition on one of said circuits for initiating the opening of said first mentioned circuit breaker and the closing of said second circuit breaker whereby the closing of said second circuit breaker before said first mentioned circuit breaker opens occurs substantially instantaneously after the opening of said first mentioned circuit breaker, fault responsive means for opening said second circuit breaker, and means for reclosing said second circuit breaker a predetermined number of times with predetermined time intervals between successive reclosures.

ARVID E. ANDERSON.

CERTIFICATE OF CORRECTION.

Patent No. 2,065,360. December 22, 1936.

ARVID E. ANDERSON.

It is hereby certified that error appears in the printed specification of the above numbered patent requiring correction as follows: Page 4, second column, lines 13 and 14, claim 7, strike out the words "before said first mentioned circuit breaker opens" and insert the same after the word "breaker" in line 12, same claim; and that the said Letters Patent should be read with this correction therein that the same may conform to the record of the case in the Patent Office.

Signed and sealed this 9th day of March, A. D. 1937.

(Seal)

Henry Van Arsdale
Acting Commissioner of Patents.